(12) United States Patent
Chinnock et al.

(10) Patent No.: US 9,227,785 B2
(45) Date of Patent: Jan. 5, 2016

(54) ACTIVE CONTROL ROLLER TOP MODULAR CONVEYING ASSEMBLY

(71) Applicants: Eric Medin Chinnock, West Milwaukee, WI (US); Justin Michael Stefanko, Greenfield, WI (US); Tad Chandler Rinehart, Hustisford, WI (US); Joseph Robert Labermeier, East Troy, WI (US)

(72) Inventors: Eric Medin Chinnock, West Milwaukee, WI (US); Justin Michael Stefanko, Greenfield, WI (US); Tad Chandler Rinehart, Hustisford, WI (US); Joseph Robert Labermeier, East Troy, WI (US)

(73) Assignee: Rexnord Industries LLC, Milwaukee, WI (US)

( * ) Notice: Subject to any disclaimer, the term of this patent is extended or adjusted under 35 U.S.C. 154(b) by 0 days.

(21) Appl. No.: 14/061,884

(22) Filed: Oct. 24, 2013

(65) Prior Publication Data
US 2014/0116853 A1 May 1, 2014

Related U.S. Application Data

(60) Provisional application No. 61/718,229, filed on Oct. 25, 2012.

(51) Int. Cl.
*B65G 39/20* (2006.01)
*B65G 17/40* (2006.01)
*B65G 17/06* (2006.01)
*B65G 47/26* (2006.01)
*B65G 17/24* (2006.01)

(52) U.S. Cl.
CPC .............. *B65G 17/061* (2013.01); *B65G 17/24* (2013.01); *B65G 17/40* (2013.01); *B65G 39/20* (2013.01); *B65G 47/261* (2013.01); *B65G 47/268* (2013.01)

(58) Field of Classification Search
CPC ....... B65G 39/20; B65G 47/268; B65G 17/40
USPC ......................................... 198/779, 850–853
See application file for complete search history.

(56) References Cited

U.S. PATENT DOCUMENTS

| 3,406,810 A * | 10/1968 | Blair et al. ..................... 198/779 |
| 3,653,489 A | 4/1972 | Tullis et al. |
| 3,707,923 A * | 1/1973 | Woodling ...................... 104/137 |
| 4,231,469 A | 11/1980 | Arscott |
| 4,262,794 A | 4/1981 | Bourgeois |

(Continued)

FOREIGN PATENT DOCUMENTS

EP 1655243 A1 5/2006

OTHER PUBLICATIONS

PCT International Search Report and Written Opinion, PCT/US2013/066565, Jan. 21, 2014, 11 pages.

(Continued)

*Primary Examiner* — Mark A Deuble
(74) *Attorney, Agent, or Firm* — Quarles & Brady LLP

(57) ABSTRACT

A modular conveying assembly includes active roller control for reducing backline pressure without product to product contact when accumulating products. The conveying assembly includes a first roller belt module having a top surface and at least one first roller axle support extending above the top surface. The first axle support supports at least one roller above the top surface. The at least one roller is rotatably coupled to a rotatably driven drive axle, such that rotation of the drive axle causes rotation of the roller. A clutch including a driven surface fixed to the drive axle engages a driving member to rotatably drive the drive axle and, thus the roller.

18 Claims, 14 Drawing Sheets

(56) References Cited

U.S. PATENT DOCUMENTS

| | | | |
|---|---|---|---|
| 4,821,169 A | | 4/1989 | Sites et al. |
| 4,880,107 A | | 11/1989 | Deal |
| 5,044,920 A | * | 9/1991 | Gerlach ................ 425/445 |
| 5,096,050 A | * | 3/1992 | Hodlewsky ............ 198/779 |
| 6,148,989 A | * | 11/2000 | Ecker ..................... 198/387 |
| 6,758,323 B2 | | 7/2004 | Costanzo |
| 7,040,480 B2 | | 5/2006 | Sedlacek |
| 7,360,641 B1 | | 4/2008 | Fourney |
| 8,151,978 B2 | | 4/2012 | Wieting et al. |
| 8,678,180 B2 | * | 3/2014 | Marshall et al. ........ 198/853 |
| 2006/0144678 A1 | * | 7/2006 | Fandella ................. 198/851 |
| 2007/0034484 A1 | * | 2/2007 | Fandella ................. 198/851 |
| 2007/0034485 A1 | * | 2/2007 | Fandella ................. 198/851 |
| 2009/0008218 A1 | | 1/2009 | Fourney |
| 2009/0250320 A1 | * | 10/2009 | Steinstrater et al. .... 198/779 |

OTHER PUBLICATIONS

Blue Arc Engineering, ZiPline Zero Pressure Accumulating Conveyor, www.youtube.com/watch?v=UQIci4AKEY4, Jul. 26, 2010.

Hytrol Conveyor Company, EZLogic, Electronic Zero-Pressure Logic, www.hytrol.com/web/innovations/EZLogic-accumulation.html, Jun. 19, 2010.

Intralox, Activated Roller Belt, www.intralox.com/ARBHome.aspx, Sep. 7, 2008.

Keymas Ltd., Zero Pressure Conveyor, www.keymas.co.uk/zero_line_pressure.htm, Oct. 28, 2005.

* cited by examiner

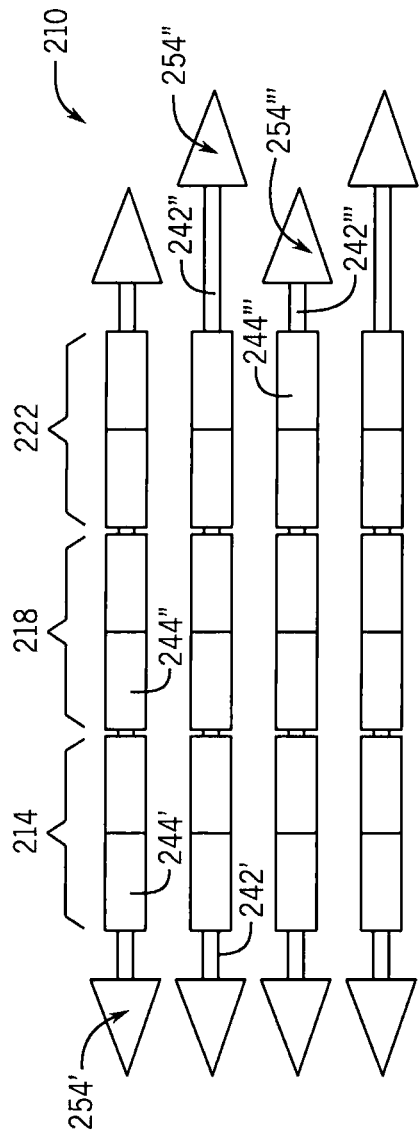
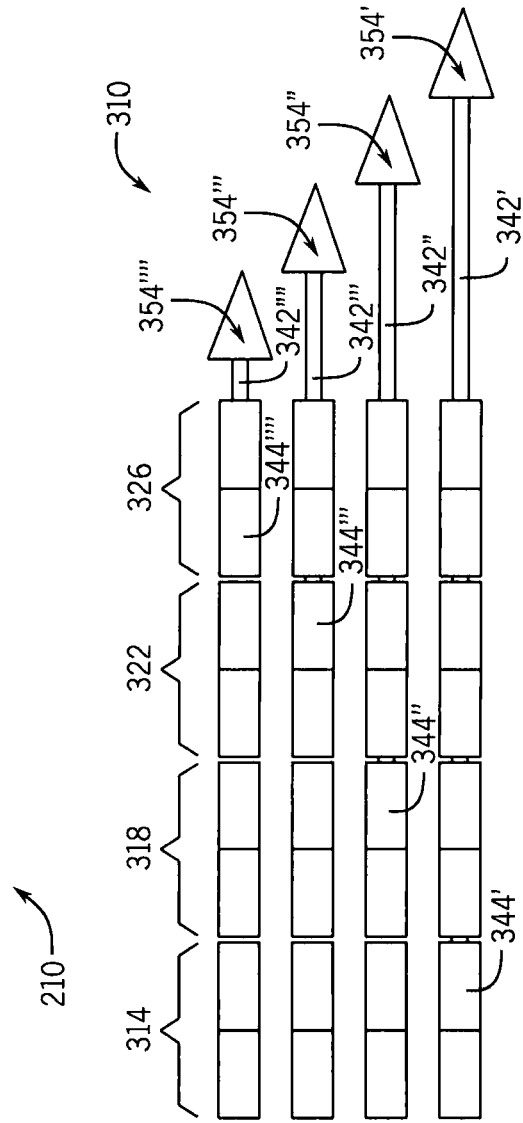
FIG. 13
FIG. 14

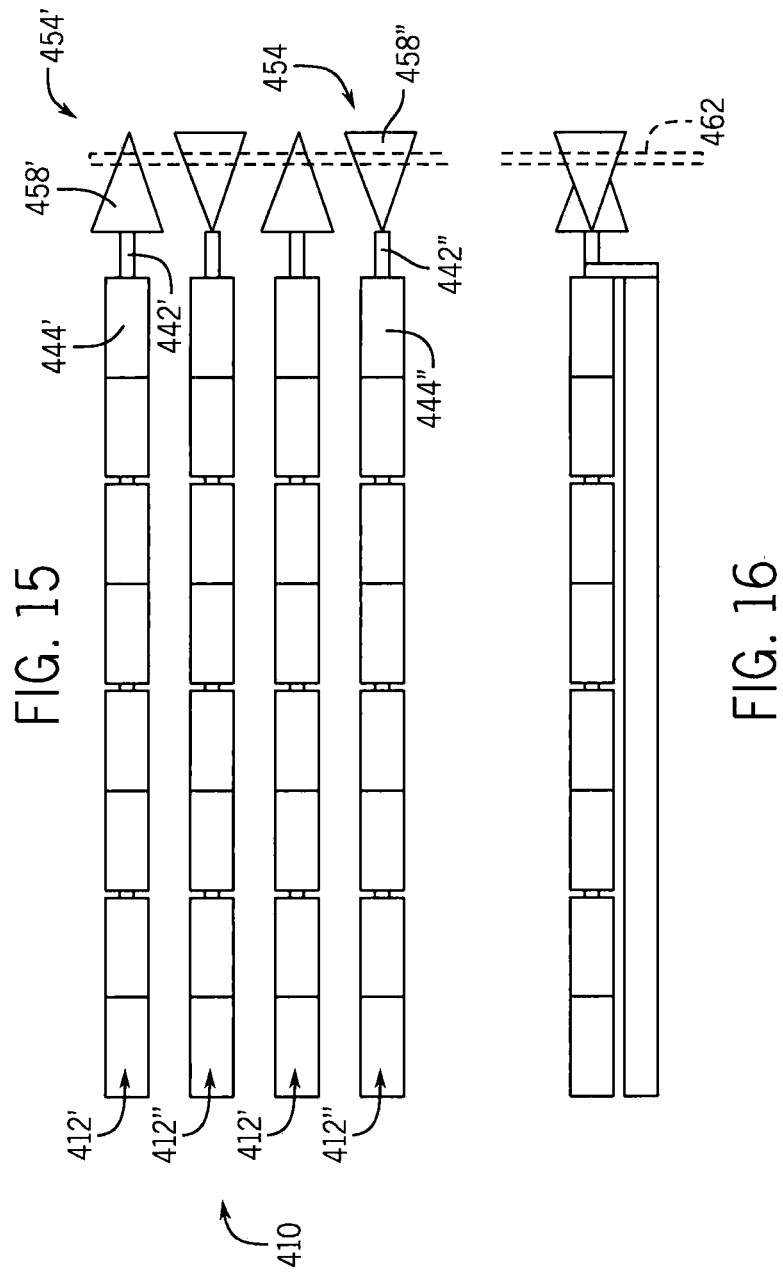

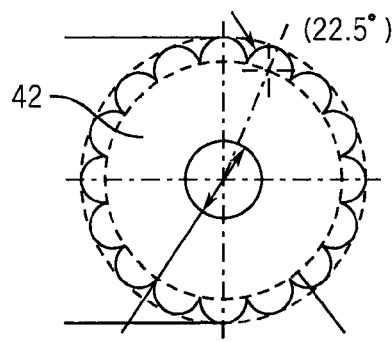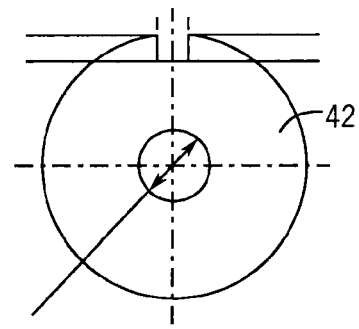
FIG. 17a    FIG. 17b
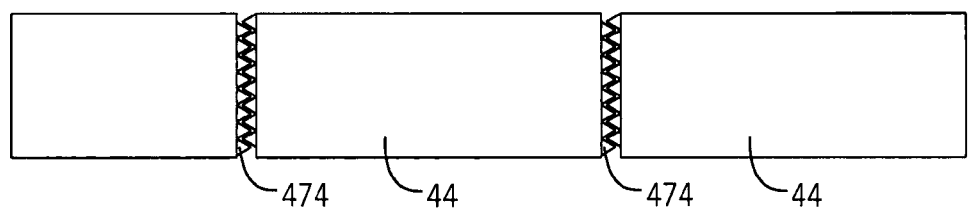
FIG. 18
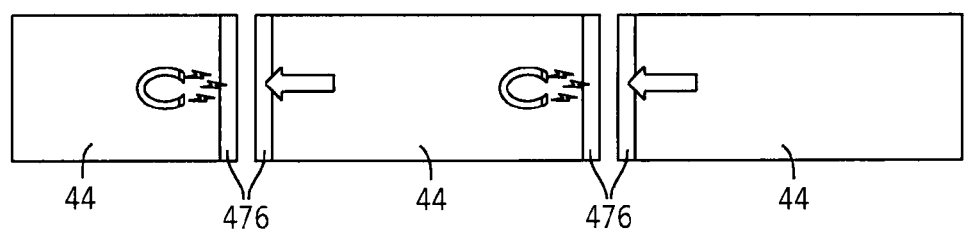
FIG. 19

ACTIVE CONTROL ROLLER TOP MODULAR CONVEYING ASSEMBLY

CROSS REFERENCES TO RELATED APPLICATIONS

This application claims priority to Provisional Patent Application No. 61/718,229 filed on Oct. 25, 2013, the entire contents of which are incorporated herein by reference.

STATEMENT REGARDING FEDERALLY SPONSORED RESEARCH

Not Applicable.

BACKGROUND OF THE INVENTION

The present invention relates to modular conveyor belts and chains, and more particularly to an active control roller top conveyor module and a modular conveying assembly including at least one of the conveyor modules.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel.

Modular belts can transport products in the direction of conveyor travel, but have difficulty accumulating a product to reduce backline pressure. In addition, the belt can easily damage a high friction products during accumulation. One known solution to this problem is to rotatably mount rollers directly on the hinge pin connecting modules together, such that the hinge pin supports the rollers between hinge members. The roller rotates about an axis of rotation that is substantially coaxial with the hinge pin axis. Because it is necessary to have a portion of the roller extend above the module to engage the object being conveyed to reduce backline pressure, the required roller diameter is determined by the hinge pin location and the height of the module. Unfortunately, this often results in requiring a large diameter roller that extends both above and below the module when that configuration is not always desired. Moreover, supporting the roller on the pin alone can result in undesirable pin wear.

Another known solution for reducing backline pressure is disclosed in U.S. Pat. No. 4,231,469 issued to Arscott. In Arscott, rollers are supported by roller cradles between modules. The rollers extend above the cradle for rolling contact with an object being conveyed independent of the location of the hinge pins. The rollers reduce friction between the belt and the object. Unfortunately, assembling the roller in the cradle is difficult, requiring insertion of the roller into the cradle, and then slipping an axle or two stub axles through holes formed through the cradle walls and into the roller. The axle must then be secured to prevent it from slipping out of one of the holes formed in the cradle wall.

Rexnord Industries, LLC of Milwaukee, Wis. developed roller top conveying modules that include roller axle supports that support freewheeling rollers above a module top surface. See U.S. Pat. Nos. 8,151,978, 5,096,050, 4,880,107, and 4,821,169. These modules are easily assembled and do not require oversize rollers extending through the conveyor modules. These prior art modules allow accumulation of product being conveyed by a conveying system formed from modules by providing a low backline pressure when the products are stopped on the moving modules. Absent individual external stops for each product being conveyed, the conveyed products engage other products when accumulating on the conveyor system.

SUMMARY OF THE INVENTION

The present invention provides a modular conveying assembly with active roller control for reducing backline pressure without product to product contact when accumulating products. The conveying assembly includes a first roller belt module having a top surface and at least one first roller axle support extending above the top surface. The first axle support supports at least one roller above the top surface. The at least one roller is rotatably coupled to a rotatably driven drive axle, such that rotation of the drive axle causes rotation of the roller. A clutch including a driven surface fixed to the drive axle engages a driving member to rotatably drive the drive axle and, thus the roller.

A general objective of the present invention is to provide a belt module and a modular conveying assembly formed therefrom that can accumulate objects without product to product contact. This objective is accomplished by providing a conveyor belt module having an actively driven roller rotatably supported above the conveyor module body top surface.

This and still other objectives and advantages of the present invention will be apparent from the description which follows. In the detailed description below, preferred embodiments of the invention will be described in reference to the accompanying drawing. These embodiments do not represent the full scope of the invention. Rather, the invention may be employed in other embodiments. Reference should therefore be made to the claims herein for interpreting the breadth of the invention.

In one embodiment, the invention provides a modular conveying assembly that includes a first belt module including a body having a top surface, a first hinge member extending forwardly from the body in a direction of conveyor travel and including a first opening for receiving a first hinge pin, and a second hinge member extending from the body in a direction opposite to the first hinge member and including a second opening for receiving a second hinge pin. An axle support extends in an upward direction from the top surface, a driven axle is supported above the top surface by the axle support, and a driven surface is fixed to the driven axle and engageable with a driving member. The driven axle is rotatably driven upon engagement of the driving member with the driven surface.

In another embodiment, the invention provides a modular conveying assembly that includes a body arranged to be conveyed in a conveying direction, an axle mounted to the body for conveyance therewith, a roller fixed to the axle, a driven surface fixed to the axle, and a driving member arranged to selectively engage the driven surface to affect rotation of the axle.

In another embodiment, the invention provides a method of accumulating an object on a conveyor. The method includes translating a belt of conveyor modules in a first direction, supporting the object on the belt for motion in the first direction, and contacting a driven surface of one of the conveyor modules with a driving member such that the conveyor module urges the object in a second direction substantially different from the first direction.

BRIEF DESCRIPTION OF THE DRAWINGS

FIG. 13 is a top view of a three-zone modular conveyor belt assembly according to the invention.

FIG. 14 is a top view of a four-zone modular conveyor belt assembly according to the invention.

FIG. 15 is a top view of a modular conveyor belt assembly according to the invention that includes two different motion zones.

FIG. 16 is a front view of the modular conveyor belt assembly of FIG. 15.

FIGS. 17a and 17b are section views of roller axles according to the invention.

FIG. 18 is a top view of a toothed connection between rollers.

FIG. 19 is a top view of a magnetic connection between rollers.

DETAILED DESCRIPTION OF PREFERRED EMBODIMENTS

Figure 1:
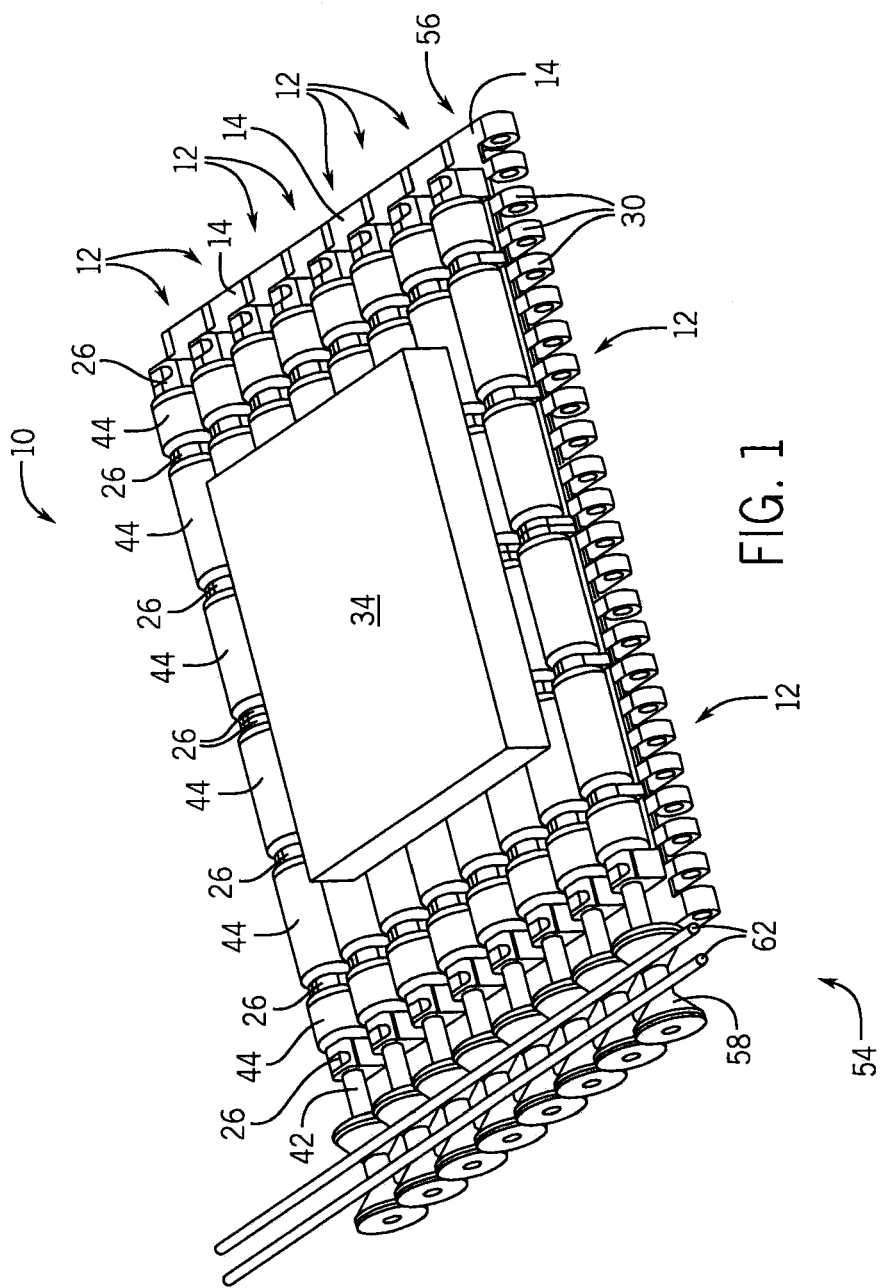
FIG. 1 is a perspective view of a modular conveyor belt assembly according to the invention.

A modular conveying assembly, or belt 10, shown in FIG. 1, includes a plurality of belt modules 12 assembled in an edge to edge relation to form the continuous belt 10. Hinge pins 40 (see FIG. 2) join adjacent modules 12, and pivotally connect the adjacent modules 12 in the direction of belt travel. Roller axle supports 26 extending upwardly from a module body 14 of each belt module 12 support a roller axle 42 (see FIG. 2) having a plurality of rollers 44 fixed thereto. The rollers 44 rotatably engage an object 34 being conveyed by the belt 10 to reduce friction between the belt 10 and the object and, as described below, selectively convey the object relative to the module body 14. The modules 12 are preferably formed using methods known in the art, such as injection molding, from materials known in the art, such as acetal, polyethylene, polypropylene, nylon, and the like.

Figure 3:
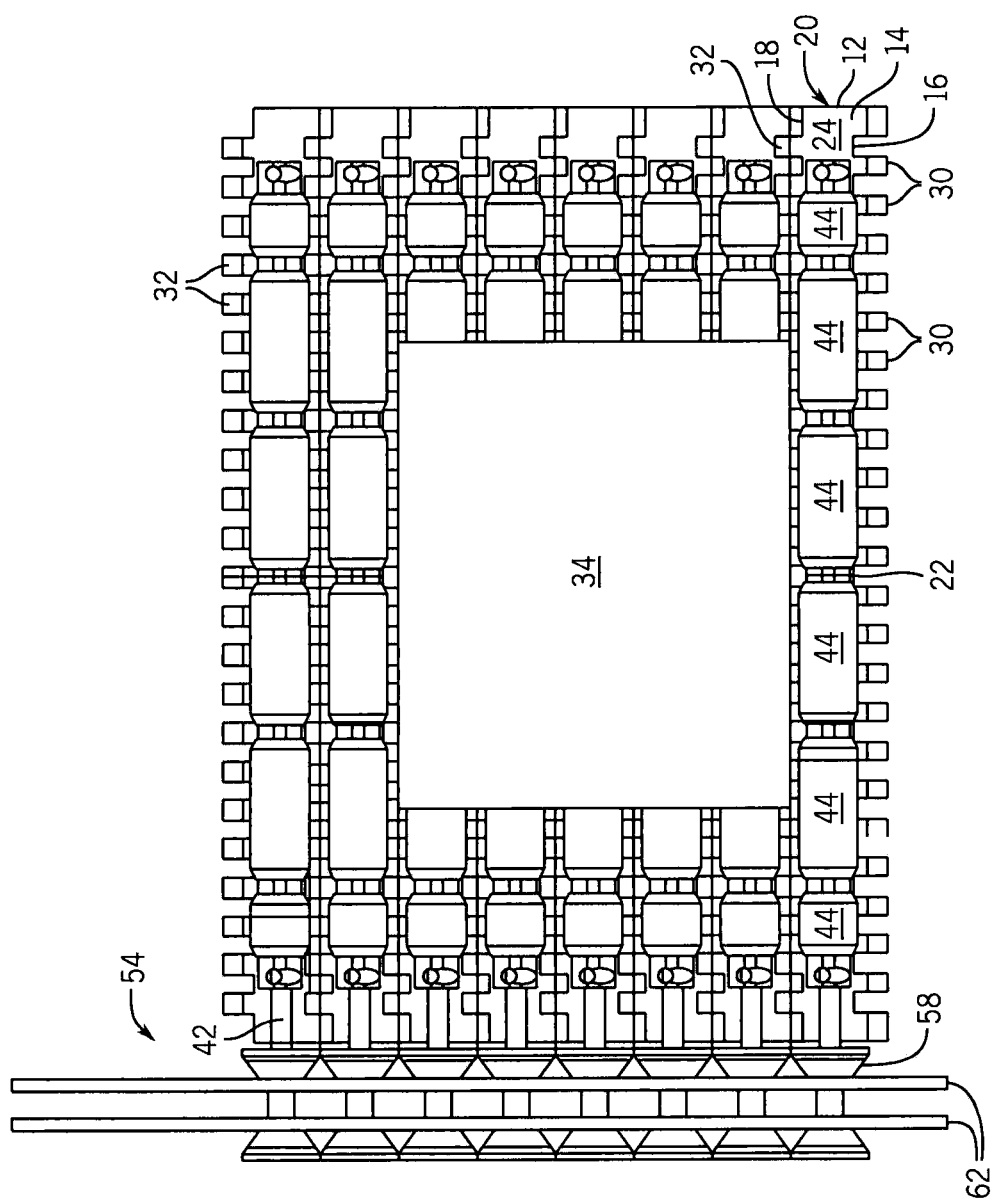
FIG. 3 is a top view of the assembly shown FIG. 1.
Figure 4:
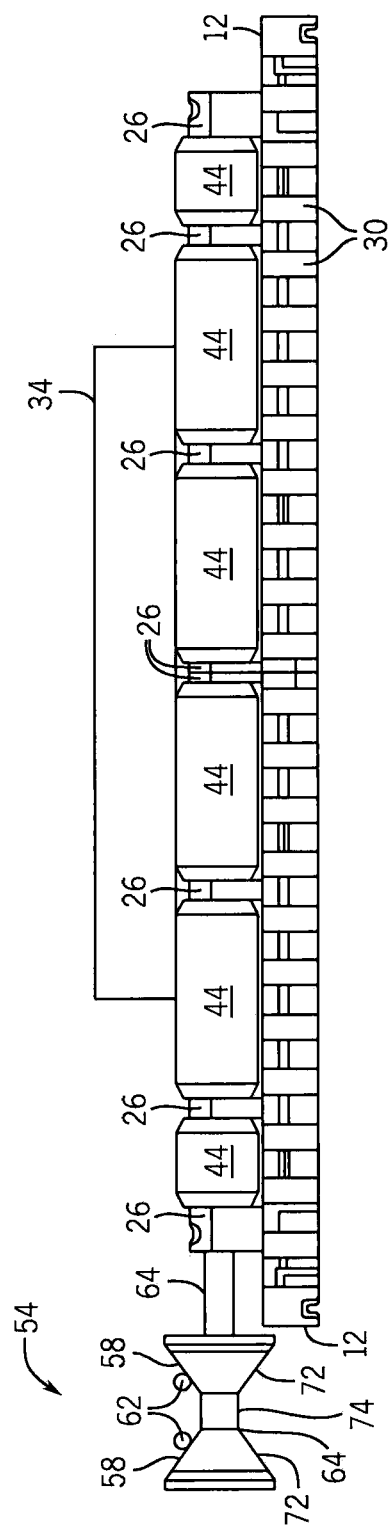
FIG. 4 is a front view of the assembly shown FIG. 1.

Each module 12 includes a body 14 having a top surface 24 (see FIG. 3) surrounded by a leading edge 16 and trailing edge 18 joined by a first side edge 20 and a second side edge 22. Although, the terms "leading" and "trailing" are used to identify features of the module 12, the module 12 described herein can be used in any direction, or orientation without departing from the scope of the invention. Advantageously, the top surface 24 can prevent products from falling through the belt 10. Of course, the top surface 24 can also have perforations to allow air or fluid flow for cooling, drafting, and/or draining. The module body 14 has a width which is defined by the distance between the side edges 20, 22, and a length which is defined by the distance between the leading and trailing edges 16, 18.

Figure 2:
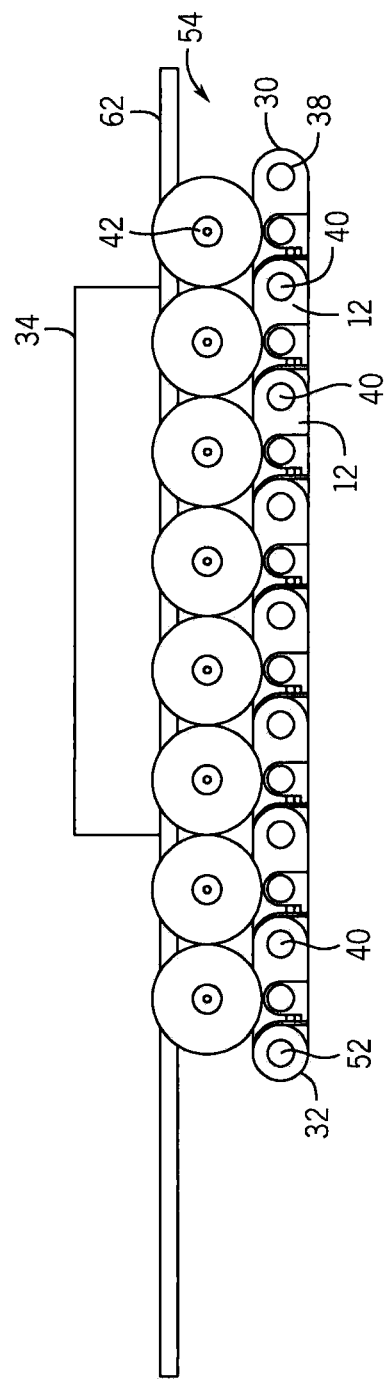
FIG. 2 is a side view of the assembly shown in FIG. 1.

With reference to FIG. 2, each leading edge hinge member 30 extends forwardly from the leading edge 16 of the module body 14, and includes a coaxial opening 38 for receiving the hinge pin 40. Each leading edge hinge member opening 38 receives the hinge pin 40 pivotally connecting the leading edge hinge members 30 of one module 12 to trailing edge hinge members 32 of an upstream module 12. The leading edge hinge members 30 intermesh with trailing edge hinge members 32 extending rearwardly from the trailing edge 18 also include coaxial openings 52. The trailing edge hinge members 32 include coaxial openings 52 that receive the hinge pin 40 to pivotally connect the trailing edge hinge members 32 of the module 12 to leading edge hinge members 30 of a downstream module 12.

The roller axle supports 26 are spaced across the module top surface 24 in a row 56 transverse to the direction of conveyor travel. Each axle support 26 includes a coaxial opening 46 for receiving the roller axle 42. Advantageously, the plurality of axle supports 26 do not allow the roller axle 42 to pop upwardly away from the modules 12 if the roller 44 or roller axle 42 catches an object. Although a plurality of axle supports 26 in a single row on each module 12 is shown, a single axle support extending upwardly from the module top surface forming a row or a plurality of axle support rows on a single module can be provided without departing from the scope of the invention.

The roller axle 42 can be formed from any material, such as a polymeric material, metal, and the like. Polymeric roller axles 42 are preferred because they are lighter and produce less noise. Each roller axle 42 supports a plurality of the rollers 44. Preferably, a single roller 44 is disposed between a pair of axle supports 26, however, a plurality of rollers 44 can be provided between a pair of axle supports 26 without departing from the scope of the invention.

The rollers 44 support the object 34 being conveyed by the belt 10 above the module body 14 and are rotatably fixed to the roller axle 42. At least a portion of each roller 44 extends above the roller axle supports 26 to engage the object being conveyed by the belt 10. Preferably, each roller 44 is molded from a plastic, and includes a through hole 46 formed there through for receiving the roller axle 42. The rollers 44 can be rotatably fixed to the roller axle 42 using methods known in the art, such as by chemically bonding the roller 44 to the axle 42, fusing the roller 44 to the roller axle 42, integrally forming the roller axle 42 and roller 44 as a single piece, forming a through hole axially through the roller 44 with a noncircular cross section and inserting the roller axle 42 having a complementary cross section through the roller 44 through hole, and the like without departing from the scope of the invention. Although a plastic roller is disclosed, the roller can be formed from any material, such as elastomers, metals, and the like, suitable for the particular application without departing from the scope of the invention.

The roller axle 42, and thus the rollers 44 are selectively rotatably driven to accumulate objects on the conveyor system without excessive product to product contact and/or to selectively space objects conveyed by the conveying system. In the embodiment shown in FIGS. 1-4, the roller axle 42 is actively driven by a clutch 54 having a driven surface 58 fixed to one end of the roller axle 42 and a fixed driving member 62, or bar, adjacent the belt 10. The driving member 62 engages the driven surface 58 to rotatably drive the roller axle 42, and thus the roller 44. In a preferred embodiment, movement of the conveyor module 12 relative to the fixed driving member 62 engaging the driven surface 58 of the clutch 54 causes the driven surface 58, and thus, the roller axle 42 and rollers 44 to rotate.

In one embodiment, the driven surface 58 is conical to control the rotational speed of the roller 44 without changing the conveying speed of the belt 10. In particular, the rotational speed of the roller 44 varies by engaging the conical driven surface 58 at different radii of the conical driven surface 58 with the driving member 62. As a result, when the belt 10 travels at a constant conveying speed, the rollers 44 will rotate faster when the fixed driving member 62 engages a small radial cross section of the conical driven surface 58, i.e. proximal an apex 64 of the conical driven surface 58 (see FIG. 4), compared to the rotational speed of the rollers 44 when the fixed driving member 62 engages a larger radial cross section of the conical driven surface 58.

Figure 5:
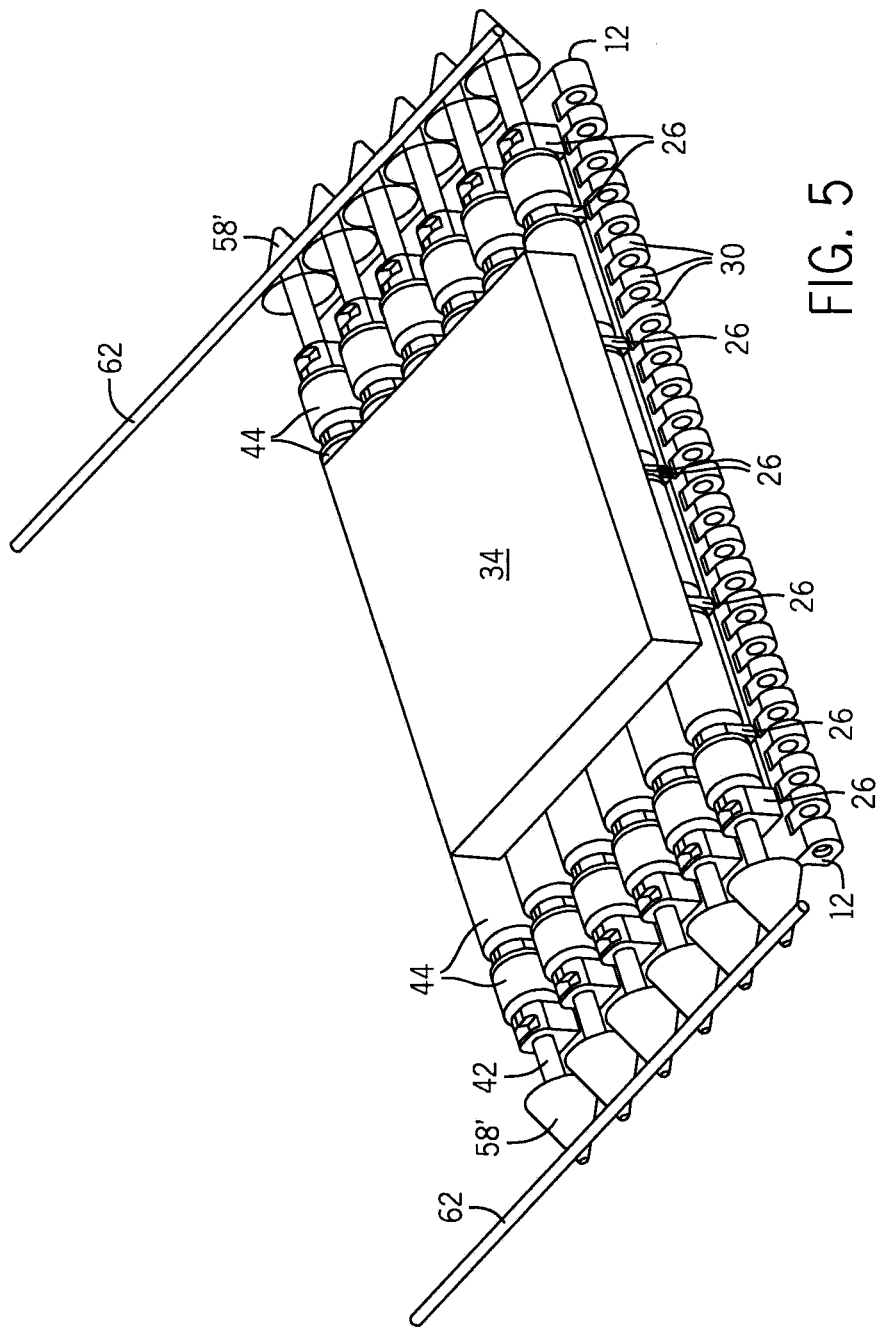
FIG. 5 is a front view of another modular conveyor assembly according to the invention and having rollers driven from both sides of the assembly.
Figure 6:
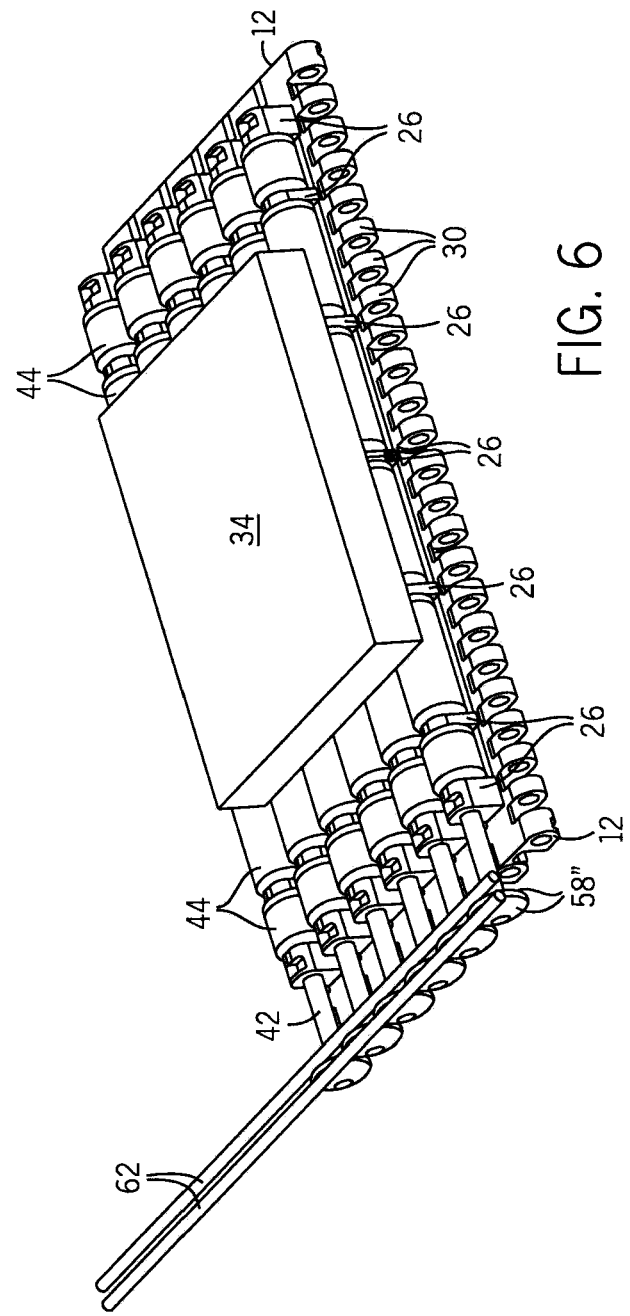
FIG. 6 is a perspective view of another modular conveyor assembly according to the invention in which the driven axle rotatably drives a roller axle defining an angle with the driven axle.

In the embodiment disclosed in FIGS. 1-4, the driven surface 58 is formed having two conical driven surfaces 72 forming part of two cones joined at their apex by a cylindrical driven surface 74. The driven surface 58, however, can be any shape compatible with the driving member without departing from the scope of the invention. For example, the driven surface 58' can be a single conical surface, such as shown in FIG. 5, cylindrical, frustoconical, two frustoconical surfaces 58" joined at their base, such as shown in FIG. 6, have teeth engageable with a toothed rack driving member, stepped, and the like. Moreover, although the driven surface 58 is shown on one end of the roller axle 42, the driven surface 58 can be on both ends of the roller axle 42, such as shown in FIG. 5, between the roller axle ends, or fixed to a driven axle coupled to the roller axle 42 without departing from the scope of the invention. Although a driven surface 58 separate from the rollers 44 is shown, the driven surface can be an outer surface of one or more of the rollers 44 without departing from the scope of the invention.

In a preferred embodiment, the driving member 62 is at least one bar positioned adjacent modules 12 of the belt 10 and arranged in a direction extending in the conveying direction. The driving member 62 is fixed relative to the conveying direction of the modules 12 and selectively engagable with the different locations on the driven surface 58 to rotatably drive the roller axle. In a preferred embodiment, the driving member 62 is selectively lowered into engagement with the driven surface 58. In another embodiment, multiple driving members 62 are disposed above the driven surface 58 and one of the driving members 62 is selectively engaged with the driven surface 58 depending upon the desired rotational speed of the roller axle 42. Although a driving member 62 fixed relative to the conveying direction of the modules 12 is shown, the driving member can be movable relative to the conveying direction of the modules, such as an endless driven belt engaging the driven surface, without departing the scope of the invention.

Figure 7A:
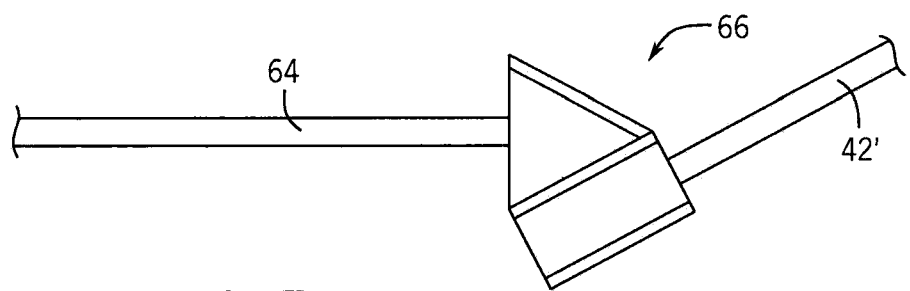
FIG. 7a is a front view of an alternative axle arrangement including a driven axle that rotatably drives a roller axle arranged at an angle with respect to the driven axle.
Figure 7B:
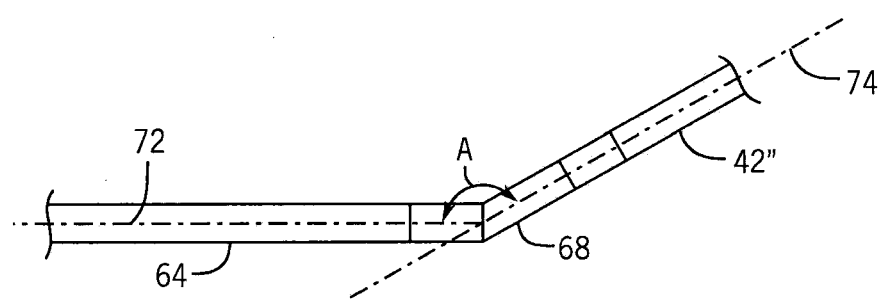
FIG. 7b is a front view of an alternative axle arrangement including a driven axle that rotatably drives a roller axle arranged at an angle with respect to the driven axle.
Figure 8:
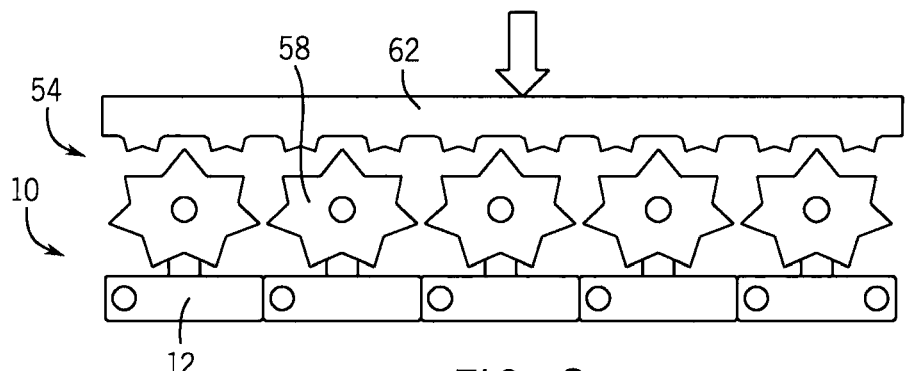
FIG. 8 is a side view of another modular conveyor belt assembly according to the invention and having toothed clutch assembly.

In the embodiment described above, the roller axle 42 is the driven axle. However, as shown in FIG. 7a, the embodiments described herein can include a separate driven axle 64 coupled to the roller axle 42' to provide other advantages. For example, the driven axle 64 can be coupled to the roller axle 42', such as by a frictional engagement or gear mechanism 66 that rotatably drives the roller axle 42' counter to the rotational direction of the driven axle 64 in order to urge objects on the rollers in the direction of conveyor travel and space the objects on the conveyor. If a gear mechanism is used, the mechanism can include an intermediate gear that rotates the roller axle in the same direction as the driven axle. Alternatively, as shown in FIG. 7b, the driven axle 64 can be coupled to a roller axle 42" by a flexible coupling 68, such as a tube engaging ends of the driven axle 64 and roller axle 42". The flexible coupling 68 allows a longitudinal axis 72 of the roller axle 42" to define an angle A with a longitudinal axis 74 of the driven axle 64, such that rollers fixed to and coaxial with the roller axle urge objects onto or off of the belt 10.

When the modules 12 are configured in a belt arrangement, i.e. two or more modules 12 define the belt width and are arranged in a side edge to side edge and leading edge to trailing edge configuration. In a belt that is multiple modules wide, the roller axles can be driven independently or extend across modules, either as a single axle or multiple axles coupled together. Moreover, as shown in FIG. 5, the roller axle can be driven from one or both sides of the belt with a driven surface fixed on each driven axle. Advantageously, when independent axles are driven by opposite sides of the belt, conveyed product can be accumulated side by side or a conveyed product can be oriented on the belt by driving the driven axle coupled to a driven surface on one side of the belt in a direction opposite of the driven axle coupled to a driven surface of the other side of the belt to spin the conveyed product on the belt.

The belt 10 is assembled by intermeshing the trailing edge hinge members 32 of one of the modules 12 with the leading edge hinge members 30 of the adjacent module 12, such that the trailing hinge member openings 52 of the one module 12 are aligned with and the leading edge hinge member openings 38 of the other module 12. A hinge pin 40 is then slipped through the aligned hinge member openings 38, 52 to pivotally link the adjacent modules 12 together.

Several alternate constructions of the inventive concept will be discussed below with respect to FIGS. 9-26.

Figure 9:
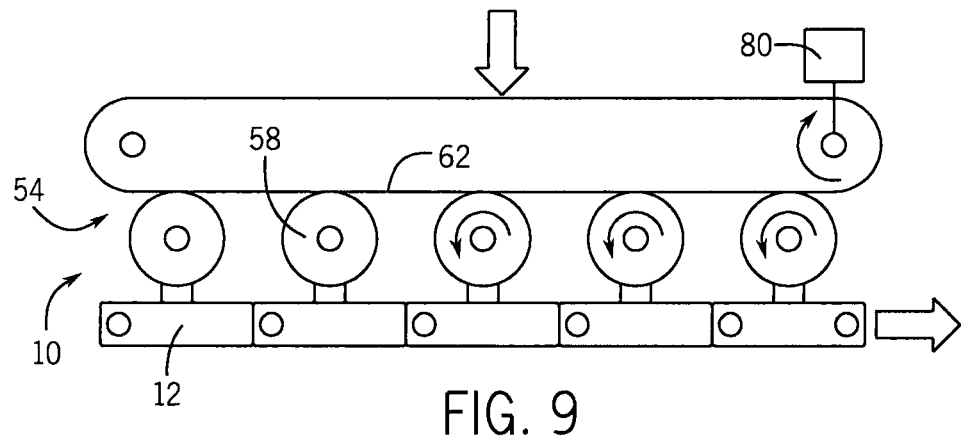
FIG. 9 is a side view of another modular conveyor belt assembly according to the invention and having a driving member including a motor driven belt.

FIG. 9 shows an alternate embodiment wherein the clutch 54 includes toothed driven surfaces 58 and a corresponding toothed driving member 62. The teeth can be corresponding star shapes, or the teeth may be acme gears or another gear shape, as desired. For example, the driven surfaces 58 and driving members 62 may be arranged similar to a rack and pinion. Similar to the embodiment illustrated in FIGS. 1-4 the driving member 62 may be a stationary element that is raised and lowered into engagement with the driven surfaces 58 to effect rotation of the rollers 44.

Figure 10:
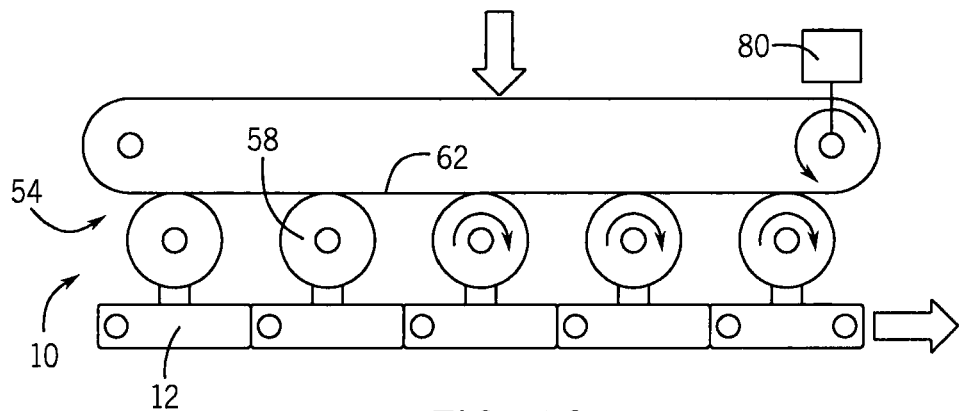
FIG. 10 is a side view of the modular conveyor belt assembly of FIG. 9 showing the motor driven belt rotating in a direction opposite of that shown in FIG. 9.

FIGS. 9 and 10 show an alternate embodiment wherein the driving member 62 is a continuous belt driven by a motor 80.

The motor 80 may be a constant speed motor or a variable speed motor, as desired. The motor 80 is arranged to selectively drive the driving member 62 to affect the behavior of the rollers 44. For example, in FIG. 9 the motor 80 is rotating the driving member 62 such that the rollers 44 are rotated to accumulate the object 34, In FIG. 10 the motor 80 is driven in an opposite direction such that objects are accelerated along the rollers 44. The rotation of the rollers 44 may be affected to produce the relative motion of the object 34 as desired. For example, the level of deceleration and/or acceleration can be varied. In addition, a number of zones may be arranged along the direction of travel, each zone including a separate belt 62 and motor 80, such that sequential object 34 manipulation is provided.

Figure 11A:
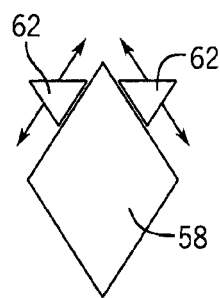
FIGS. 11a-c are side views of various clutch assemblies according to the invention.
Figure 11B:
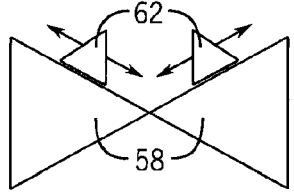
Figure 11C:
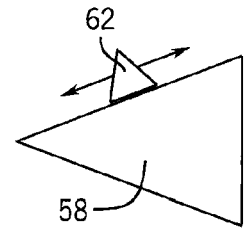

FIGS. 11a-c show various constructions of the driven surface 58 and the driving member 62. FIG. 11a depicts a cross-sectional view of a driven surface 58 that defines a diamond shaped cross section. Two driving members 62 are arranged to engage the driven surface 58 at varying positions along the driven surface 58 such that the rollers 44 would be driven at differing speeds as discussed above. Preferably, the two driving members 62 would be positioned in mirrored positions to provide consistent driving action to the rollers 44.

FIG. 11b depicts a cross-sectional view of a driven surface 58 that defines an hourglass shaped cross section. Two driving members 62 are arranged to engage the driven surface 58 at varying positions along the driven surface 58 such that the rollers 44 would be driven at differing speeds as discussed above. Preferably, the two driving members 62 would be positioned in mirrored positions to provide consistent driving action to the rollers 44.

FIG. 11c depicts a cross-sectional view of a driven surface 58 that defines conical shape. One driving member 62 is arranged to engage the driven surface 58 at varying positions along the driven surface 58 such that the rollers 44 would be driven at differing speeds as discussed above.

Figure 12:
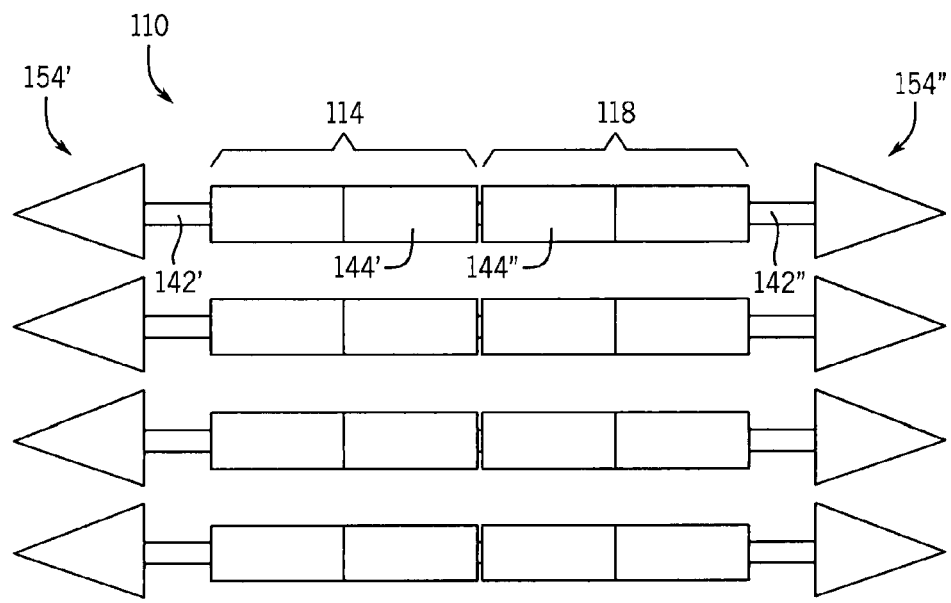
FIG. 12 is a top view of a two-zone modular conveyor belt assembly according to the invention.

FIG. 12 shows a modular conveying assembly 110 that includes a first motion zone 114 and a second motion zone 118. The first motion zone 114 includes an independent clutch 154' connected to rollers 144' by a roller axle 142'. The second motion zone 118 includes an independent clutch 154" connected to rollers 144" by a roller axle 142". The motion zones 114, 118 are operated independent of one another to create differing motion profiles.

FIG. 13 shows a modular conveying assembly 210 that includes a first motion zone 214, a second motion zone 218, and a third motion zone 222. The first motion zone 214 includes an independent clutch 254' connected to rollers 244' by a roller axle 242'. The second motion zone 218 includes an independent clutch 254" connected to rollers 244" by a roller axle 242". The third motion zone 222 includes an independent clutch 254'" connected to rollers 244'" by a roller axle 242'". In the illustrated embodiment, the clutch 254" and the clutch 254'" are cantilevered past the right (as viewed in FIG. 13) end of the conveying assembly 210 and are staggered from one another in the width direction. The motion zones 214, 218, 222 are operated independent of one another to create differing motion profiles.

FIG. 14 shows a modular conveying assembly 310 that includes a first motion zone 314, a second motion zone 318, a third motion zone 322, and a fourth motion zone 326. The first motion zone 314 includes an independent clutch 354' connected to rollers 344' by a roller axle 342'. The second motion zone 318 includes an independent clutch 354" connected to rollers 344" by a roller axle 342". The third motion zone 322 includes an independent clutch 354'" connected to rollers 344'" by a roller axle 342'"'. The fourth motion zone 326 includes an independent clutch 354"" connected to rollers 344"" by a roller axle 342"". In the illustrated embodiment, the clutches 354', 354", 354'", and 354"" are all cantilevered past the end of the conveying assembly 310 on a single side and are staggered from one another in the width direction. The motion zones 314, 318, 322, 326 are operated independent of one another to create differing motion profiles.

FIGS. 15 and 16 show a modular conveying assembly 410 that includes a first series of modules 412' and a second series of modules 412". The first series of modules 412' includes an independent clutch 454' including a driven surface 458' connected to rollers 444' by a roller axle 442'. The second series of modules 412" includes an independent clutch 454" including a driven surface 458" connected to rollers 444" by a roller axle 442". In the modular conveyor assembly 410, the driven surface 258' and the driven surface 258" are arranged in opposite orientations. In this configuration, when the driving member 462 is engaged with the driven surfaces 258' and 258" the speed of rotation of the rollers 244' and 244" will depend on the side-to-side position of the driving element 462. For example, if the driving element 462 is moved to the right in the depiction of FIG. 15, the rollers 444' of the first series of modules 412' will increase its rotational speed and the rollers 444" of the second series of modules 412" will decrease in rotational speed. In this way, various adjustable motion profiles are attainable.

FIGS. 17a and 17b show cross sections of two exemplary roller axles 42. As shown, the roller axle 42 may define a spline shape, or a keyway. Additionally, the roller axle my define other shapes (e.g., square oval, pegged, star, et cetera).

FIG. 18 shows how rollers 44 may be end connected to one another by teeth 474. FIG. 19 shows how rollers 44 may be end connected to one another by magnets 476. These connections between rollers 44 provide a way to transfer rotation without rigidly joining the rollers to the roller axle 42. Other configurations are contemplated for coupling the rollers together independent of the roller axle 42. For example, couplings, taper locks, and other connection types are usable.

Figure 20:
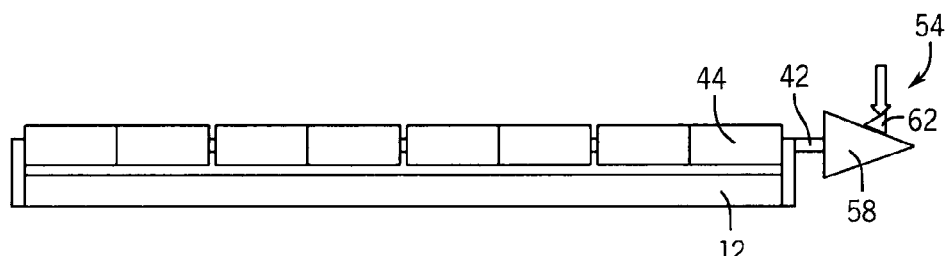
FIG. 20 is a front view of a radially actuated clutch on a modular conveyor belt assembly according to the invention.
Figure 21:
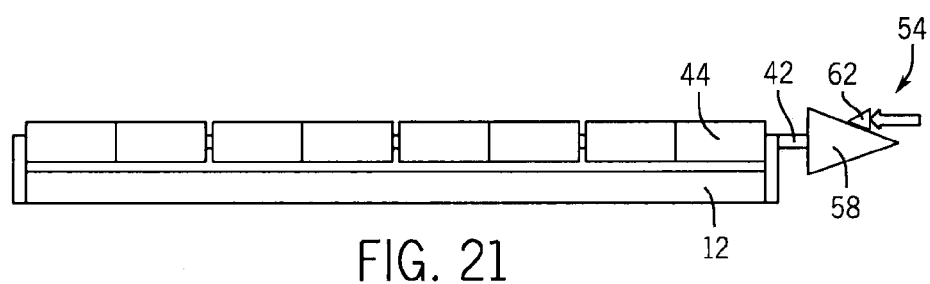
FIG. 21 is a front view of an axially actuated clutch on a modular conveyor belt assembly according to the invention.

FIGS. 20 and 21 illustrate how the driving member 62 may be actuated vertically or horizontally in and out of engagement with the driven surface 58. Any actuation scheme may be used to bring the driving member 62 into contact with the driven surface 58, as desired.

Figure 22:
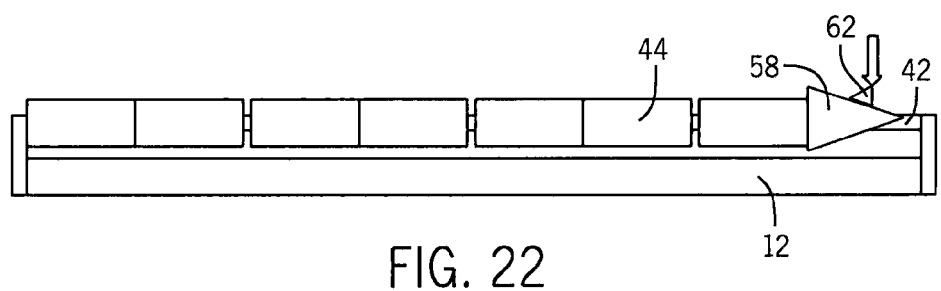
FIG. 22 is a front view of a modular conveyor belt assembly according to the invention that includes an inset clutch assembly.

FIG. 22 shows how the driven surface 58 may be inset on the module 12 as opposed to cantilevered.

Figure 23:
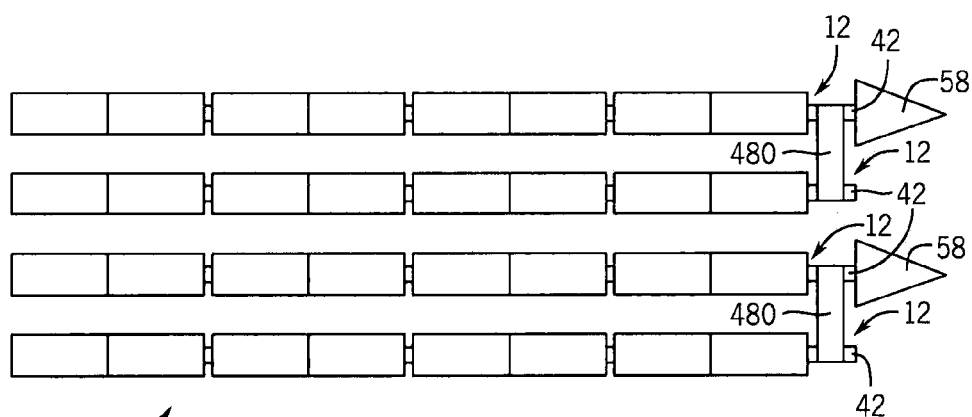
FIG. 23 is a top view of a modular conveyor belt assembly according to the invention that includes master and slave rollers.

FIG. 23 shows an arrangement where every other module 12 in the belt 10 does not include a driven surface 58 but it rather tied to an adjacent driven surface 58 by a belt 480 or other linkage capable of transferring the rotation from the driven surface 58 to the passive modules 12.

Figure 24:
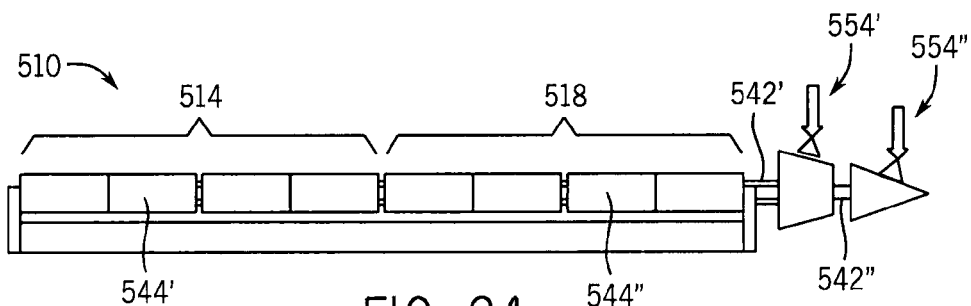
FIG. 24 is a front view of a modular conveyor belt assembly according to the invention that includes two different motion zones and coaxial roller axles.

FIG. 24 shows a modular conveying assembly 510 that includes a first motion zone 514 and a second motion zone 518. The first motion zone 514 includes an independent clutch 554' connected to rollers 544' by a first roller axle 542'. The second motion zone 518 includes an independent clutch 554" connected to rollers 544" by a second roller axle 542". The first roller axle 542' and the second roller axle 542" are arranged coaxially, with the first roller axle 542' arranged within the second roller axle 542". The motion zones 514, 518 are operated independent of one another to create differing motion profiles.

Figure 25:
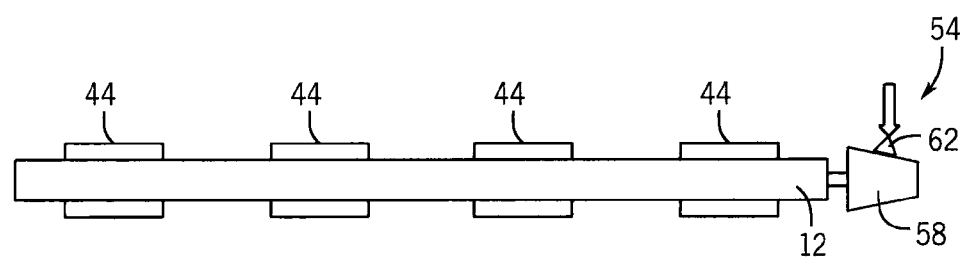
FIG. 25 is a front view of a modular conveyor belt assembly according to the invention that includes rollers that are mounted within the link and a cantilevered clutch assembly.
Figure 26:
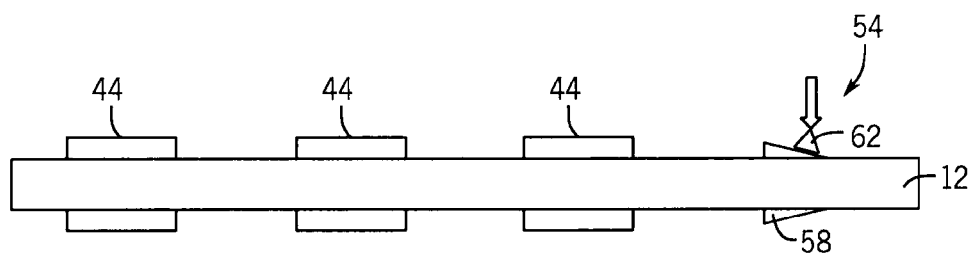
FIG. 26 is a front view of a modular conveyor belt assembly according to the invention that includes rollers that are mounted within the link and an inset clutch assembly.

FIGS. 25 and 26 illustrate how the rollers 44 may be set within the web of the module 12 without being raised above the surface 24 by the supports 26. FIG. 25 shows the clutch 54 cantilevered and FIG. 26 shows the clutch 54 set within the web of the module 12.

Figure 27:
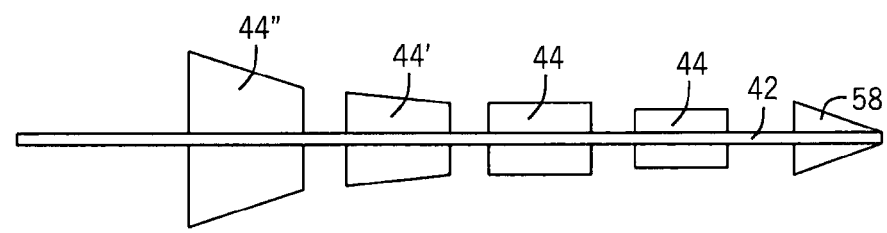
FIG. 27 is a front view of a modular conveyor belt assembly according to the invention that includes shaped rollers.

FIG. 27 shows an example of how the rollers 44 may have different shapes to provide different motion profiles of the object 34. In the illustrated embodiment, rollers 44 have a consistent diameter and are generally cylindrically shaped. Rollers 44' and 44" are generally conically shaped such that they would tend to move the object 34 to the right (as viewed in FIG. 27). Other roller shapes are considered including different arrangements of shapes. These shaped rollers may be used to direct object 34 flow on the modular conveyor assembly 10. For example, a flow of objects 34 could be divided, shifted, concentrated, or manipulated in another way as desired.

While there has been shown and described what are at present considered the preferred embodiments of the invention, it will be obvious to those skilled in the art that various changes and modifications can be made therein without departing from the scope of the invention defined by the appended claims. For example, the individual features described in the drawings may include one or more features from another embodiment. For example, the coaxial axles 542' and 542" of FIG. 24 may be arranged in the web of the module 12 as shown in FIGS. 25 and 26.

We claim:

1. A modular conveying assembly module comprising:
   a body having a top surface;
   a first driven axle mounted to the body for conveyance therewith;
   a roller fixed to the first driven axle;
   a first driven surface fixed to the first driven axle and configured to be selectively engaged by a driving member to affect rotation of the first driven axle;
   a second driven axle coaxial to the first driven axle;
   a second roller fixed to the second driven axle; and
   a second driven surface fixed to the second driven axle and configured to be selectively engaged by a second driving member to affect rotation of the second driven axle.

2. The modular conveying assembly module of claim 1, including axle supports supporting the first driven axle above the top surface of the body.

3. The modular conveying assembly module of claim 1, wherein the first driven surface and the second driven surface are staggered relative to one another.

4. The modular conveying assembly module of claim 1, wherein the roller defines a non-cylindrical shape.

5. The modular conveying assembly module of claim 1, wherein the roller is configured to support an object for conveyance, and
   wherein the first driven surface is not arranged to support the object for conveyance.

6. The modular conveying assembly module of claim 1, wherein the first driven surface is positioned proximal an end of the first driven axle.

7. The modular conveying assembly module of claim 1, wherein the first driven surface includes a tapered surface.

8. The modular conveying assembly module of claim 1, wherein a first hinge member extending forwardly from the body in a direction of conveyor travel and including a first opening for receiving a first hinge pin, a second hinge member extending from the body in a direction opposite to the first hinge member and including a second opening for receiving a second hinge pin.

9. The modular conveying assembly module of claim 8, wherein at least one of the modules includes a leading edge and a trailing edge and wherein the first hinge member extends from the leading edge and the second hinge member extends from the trailing edge.

10. The modular conveying assembly module of claim 1, wherein the first driven axle is a roller axle having at least one roller rotatably fixed thereto.

11. The modular conveying assembly module of claim 1, wherein the first driven axle is coupled to a roller axle having at least one roller rotatably fixed thereto.

12. The modular conveying assembly module of claim 11, wherein the first driven axle counter rotates the roller axle.

13. A modular conveying assembly comprising:
   a first belt module including a body having a top surface;
   a first driven axle mounted to the body for conveyance therewith;
   a first driven surface fixed to the first driven axle;
   a first driving member engageable with the first driven surface, the first driven surface is rotatably driven upon engagement of the first driving member with the first driven surface;
   a second driven axle mounted to the body for conveyance therewith;
   a second driven surface fixed to the second driven axle; and
   a second driving member engageable with the second driven surface, the second driven surface is rotatably driven upon engagement of the second driving member with the second driven surface,
   wherein the first driven axle, the first driven surface, and the first driving member define a first motion zone,
   wherein the second driven axle, the second driven surface, and the second driving member define a second motion zone that is different from the first motion zone, and
   wherein the first motion zone and the second motion zone are positioned laterally, side-by-side with one another.

14. The modular conveying assembly of claim 13, wherein the driving member is a stationary element laterally adjacent the first belt module.

15. The modular conveying assembly module of claim 13, wherein the first driving member includes a motor coupled to a continuous belt arranged for selective contact with the first driven surface, the motor driving the continuous belt at a variable speed.

16. The modular conveyor assembly of claim 13, wherein the first driven surface rotates when in contact with the first driving member.

17. The modular conveyor assembly of claim 13, wherein the first driven surface defines at least two diameters, the first driving member arranged to contact one of the two diameters.

18. A method of accumulating an object on a modular conveying assembly that includes
   a belt module including a body having a top surface and traveling in a direction of travel at a conveying speed,
   a first driven axle mounted to the body for conveyance therewith
   a roller fixed to the first driven axle,
   a first driven surface fixed to the first driven axle and configured to be selectively engaged by a first driving member to affect rotation of the first driven axle,
   a second driven axle coaxial to the first driven axle,
   a second roller fixed to the second driven axle, and
   a second driven surface fixed to the second driven axle and configured to be selectively engaged by a second driving member to affect rotation of the second driven axle, the method comprising:

supporting the object on one of the first driven axle and the second driven axle;

conveying the object along the top surface of the belt;

engaging the first driving member with the first driven surface to define a first motion zone counter rotating the first driven axle relative to the direction of travel; and engaging the second driving member with the second driven surface to define a second motion zone counter rotating the second driven axle relative to the direction of travel.

* * * * *